(12) United States Patent
Kersey

(10) Patent No.: US 9,909,910 B2
(45) Date of Patent: Mar. 6, 2018

(54) TOMOGRAPHIC AND SONAR-BASED PROCESSING USING ELECTRICAL PROBING OF A FLOWING FLUID TO DETERMINE FLOW RATE

(71) Applicant: CiDRA Corporate Services Inc., Wallingford, CT (US)

(72) Inventor: Alan D. Kersey, South Glastonbury, CT (US)

(73) Assignee: CiDRA Corporate Services Inc., Wallingford, CT (US)

( * ) Notice: Subject to any disclaimer, the term of this patent is extended or adjusted under 35 U.S.C. 154(b) by 221 days.

(21) Appl. No.: 14/436,391

(22) PCT Filed: Oct. 23, 2013

(86) PCT No.: PCT/US2013/066368
§ 371 (c)(1),
(2) Date: Apr. 16, 2015

(87) PCT Pub. No.: WO2014/066494
PCT Pub. Date: May 1, 2014

(65) Prior Publication Data
US 2015/0253164 A1 Sep. 10, 2015

Related U.S. Application Data

(60) Provisional application No. 61/717,332, filed on Oct. 23, 2012.

(51) Int. Cl.
*G01R 27/08* (2006.01)
*G01F 1/64* (2006.01)
*G01F 1/704* (2006.01)
*G01F 1/712* (2006.01)
*G01F 1/74* (2006.01)
*G01F 1/66* (2006.01)

(52) U.S. Cl.
CPC ............... *G01F 1/64* (2013.01); *G01F 1/666* (2013.01); *G01F 1/704* (2013.01); *G01F 1/712* (2013.01); *G01F 1/74* (2013.01)

(58) Field of Classification Search
CPC . G01F 1/64; G01F 1/704; G01F 1/666; G01F 1/34; G01F 1/7082; G01F 1/712; G01F 1/586; G01F 1/584
See application file for complete search history.

(56) References Cited

U.S. PATENT DOCUMENTS

| 4,328,707 A | 5/1982 | Clement et al. |
| 4,386,854 A | 6/1983 | Byer |
| 5,181,778 A | 1/1993 | Beller |
| 6,078,397 A | 6/2000 | Monchalin et al. |

(Continued)

*Primary Examiner* — Thang Le
(74) *Attorney, Agent, or Firm* — Ware, Fressola, Maguire & Barber LLP

(57) ABSTRACT

Apparatus is provided featuring a signal processor or processing module configured at least to: receive signaling containing information about electrical responses to a transiting flow perturbation in at least three planes of a fluid flowing in a pipe, tank, cell or vessel sensed using a tomographic processing technique; and determine a flow rate of the fluid flowing in the pipe, tank, cell or vessel using a combined tomography and SONAR-based algorithm and signal processing technique, based at least partly on the signaling received.

23 Claims, 7 Drawing Sheets

Signal processor or processing module 10a

Tomographic signal processing module 10a' configured to receive the signaling and provide tomographic signaling containing information about the same subset of pixels in each of the at least three planes using a tomographic algorithm and signal processing technique, based at least partly on the signaling received.

SONAR-based algorithm and signal processing module 10a'' configured to receive the tomographic signaling and determine the flow rate using a SONAR-based algorithm and signal processing technique, based at least partly on the tomographic signaling received.

(56) References Cited

U.S. PATENT DOCUMENTS

| | | |
|---|---|---|
| 6,609,069 B2 | 8/2003 | Gysling |
| 6,857,323 B1* | 2/2005 | Shajii .................. G01F 1/74 |
| | | 73/861.04 |
| 6,889,562 B2 | 5/2005 | Gysling et al. |
| 7,400,985 B2 | 7/2008 | Fernald et al. |
| 7,624,652 B2* | 12/2009 | Wee .................... G01F 1/44 |
| | | 73/861.63 |
| 7,673,524 B2 | 3/2010 | Bailey et al. |
| 7,895,903 B2 | 3/2011 | Bailey et al. |
| 2004/0168523 A1 | 9/2004 | Fernald et al. |
| 2005/0246111 A1 | 11/2005 | Gysling et al. |
| 2007/0166011 A1 | 7/2007 | Wang |
| 2009/0006008 A1* | 1/2009 | Rawat .................. G01F 1/708 |
| | | 702/45 |
| 2010/0018325 A1* | 1/2010 | Unalmis ............... G01F 1/74 |
| | | 73/861.61 |
| 2012/0038368 A1 | 2/2012 | Mahalingam et al. |
| 2012/0043969 A1 | 2/2012 | Holder et al. |
| 2013/0144548 A1* | 6/2013 | Xie ...................... G01R 27/00 |
| | | 702/65 |

\* cited by examiner

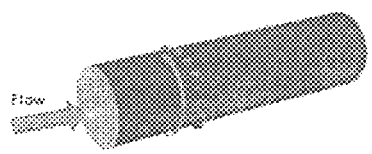
Figure 1a: Electrical Process Tomography Configuration for 'In-Pipe' Analysis
PRIOR ART
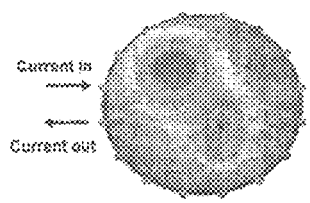
Figure 1b: Typical output of a Electrical Tomography System
PRIOR ART

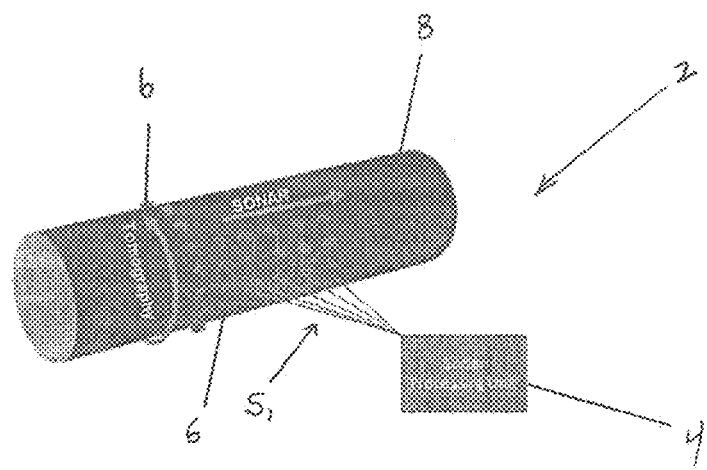
Figure 2: Proposed Hybrid Electrical Tomography System w/SONAR processing on an array of electrodes

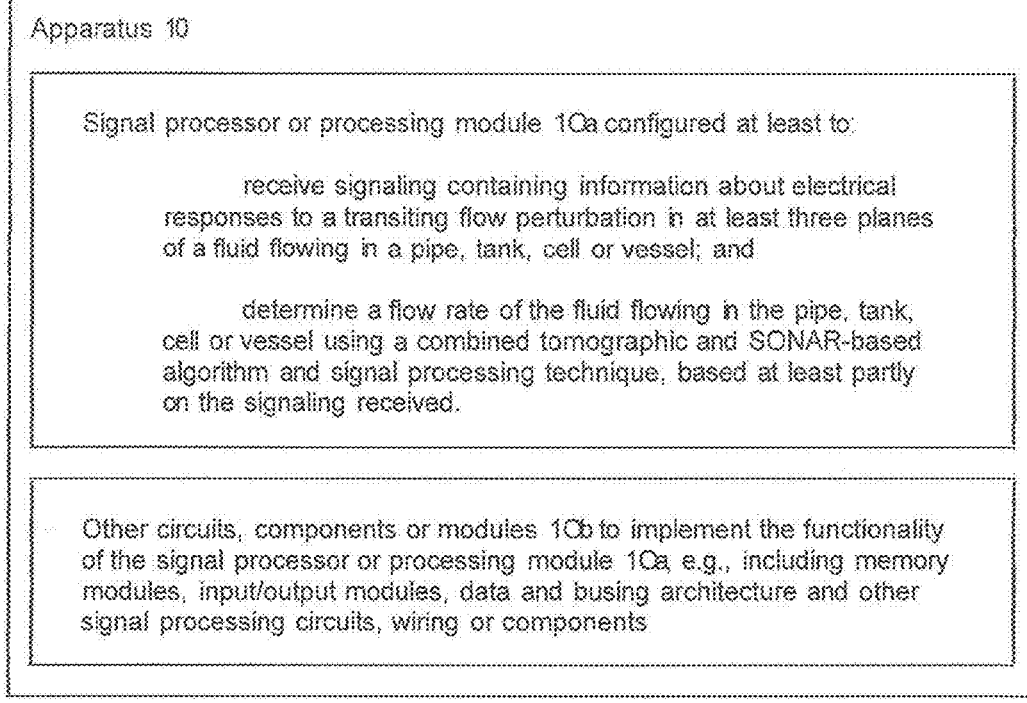
Figure 3a: The Apparatus 10

Signal processor or processing module 10a

Tomographic signal processing module 10a' configured to receive the
signaling and provide tomographic signaling containing information about
the same subset of pixels in each of the at least three planes using
a tomographic algorithm and signal processing technique,
based at least partly on the signaling received.

SONAR-based algorithm and signal processing module 10a'' configured to
receive the tomographic signaling and determine the flow rate
using a SONAR-based algorithm and signal processing technique,
based at least partly on the tomographic signaling received.

Figure 3b

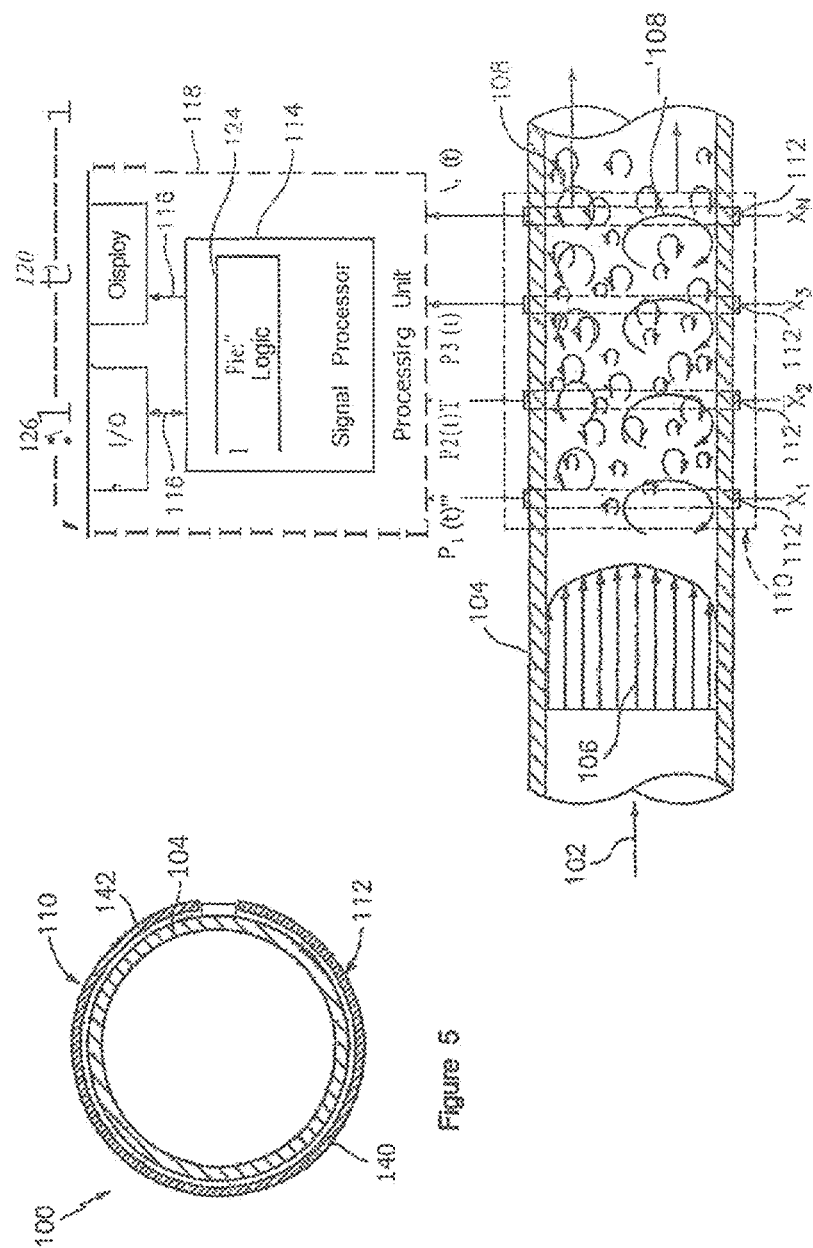

TOMOGRAPHIC AND SONAR-BASED PROCESSING USING ELECTRICAL PROBING OF A FLOWING FLUID TO DETERMINE FLOW RATE

CROSS-REFERENCE TO RELATED APPLICATIONS

This application corresponds to international patent application serial no. PCT/US13/66368, filed 23 Oct. 2013, which claims benefit to provisional patent application Ser. No. 61/717,332, filed 23 Oct. 2012, which is incorporated by reference in their entirety.

BACKGROUND OF THE INVENTION

1. Field of Invention

The present invention relates to techniques for determining a flow rate of a fluid flowing in a pipe; and more particularly related to techniques for determining a flow rate in a pipe, tank, vessel or container using a combined tomographic and SONAR-based and modeled signal processing technique.

2. Description of Related Art

Known SONAR processing typically relies on acoustic monitoring of dynamic pressure variations along a flow pipe caused by the flow, and SONAR processing of this information to yield flow rate.

Recently, several approaches to visualize a cross section of a multi-phase flow have been devised based on Electrical Resistance Tomography (ERT), or often refereed to as Electrical Impedance Tomography (EIT), or Electrical Capacitance Tomography (ECT). The former is generally used for conducting fluids, where the latter is used in non-conducting fluids. Tomographic techniques or approaches based on the use of ERT, EIT and ECT are becoming widely exploited in industrial processes for the analysis of mixing in multi-phase flows, liquid interfaces and liquid-froth layers for example.

These tomographic approaches allow visualization of a flow cross-section, and can be a powerful tool to analyze multi-phase flows, mixing, and flow stratification, etc. By way of example, FIG. 1a shows a generic configuration for 'in-pipe' tomographic imaging using multiple electrodes around the pipe wall; and FIG. 1b shows a type of image created using tomographic analysis of flows.

It has been shown that by performing tomographic processing at two (2) planes along a flow tube, a cross-sectional tomographic image formed at a first plane is correlated to that formed at a second plane to allow flow rate determination of the phase fractions. This known technique requires a reconstitution of a full tomographic image at each of the two planes, which involves a lot of signal processing.

In tomographic imaging, electrical probing is typically conducted via multiple electrodes around the pipe wall.

SUMMARY OF THE INVENTION

In summary, the present invention sets forth an extension of the 'SONAR' processing concept developed by the assignee of the present application for flow rate determination to operate via a series of electrodes used to probe the conductivity or permittivity of a fluid flowing in a pipe.

The use of a simple subset of the electrodes at multiple planes does not provide a complete visualization capability of the flow stream; however, a flow perturbation of any form passing along the pipe within the flow will likely create an electrical response at each subset array along the pipe, according to some embodiments of the present invention.

The electrical response to such a flow perturbation may be processed using a SONAR-based algorithm and processing technique to yield or determine a flow rate of the overall flow, according to some embodiments of the present invention.

In effect, if one looks at local electrical perturbations (in resistivity or permittivity) along a single axial direction (parallel to the pipe), the information gained is not sufficient to create any tomogram (as this requires multiple cross-sectional views to reconstitute the image, or tomogram), but any time varying perturbation in the electrical properties of the fluid sensed by the first electrodes in an axial array will convect along the array at the fluid bulk flow rate (exactly as with pressure variations due to vertical/turbulent effects in a standard SONAR approach).

According to the present invention, one doesn't need to generate full tomograms at each plane, the underlying correlation is there for a single axis, and thus could be interpreted by SONAR-based algorithm without the need to generate a full tomogram image at each plane.

However, also inherent in the technique according to the present invention is the fact that if one did create full tomograms at the at least three planes, took the N individual pixels of the tomogram (as defined by it's digitization resolution) and used a SONAR-based algorithm for processing between the same pixels of the tomogram for each of the three or more planes, then one could perform a simultaneous SONAR-based determination of the flow for multiple points inside the flow stream—this would provide a full 3-D map of the flow profile across the flow.

In principle, this could be done using the aforementioned prior art technique, based on two planes and using correlation on a pixel-by-pixel basis, but the accuracy would be poor. The use of the three of more planes and the SONAR-based algorithm provide a much higher resolution map.

Some advantages may include the following:

This new and unique approach may provide significant accuracy over other known approaches that rely on correlation between just two planes.

Also, the new and unique approach does not require a full tomographic visualization processing at each plane, but may be worked off, e.g., two (2) or three (3) electrodes (e.g., depending on whether ERT or ECT tomographic processing is used), and thus reduces and simplifies the processing required.

Examples of Particular Embodiments

According to some embodiments, the present invention may include, or take the form of, apparatus featuring a signal processor or processing module configured at least to:
  receive signaling containing information about electrical responses to a transiting flow perturbation in at least three planes of a fluid flowing in a pipe, tank, cell or vessel; and
  determine a flow rate of the fluid flowing in the pipe, tank, cell or vessel using a combined tomographic and SONAR-based algorithm and signal processing technique, based at least partly on the signaling received.

According to some embodiment of the present invention, the signal processor module may be configured to provide corresponding signaling containing information about the flow rate determined.

The present invention may also include one or more of the following features:

The signal processing module may include a tomographic signal processing module configured to receive the signaling and provide tomographic signaling containing information about the same subset of pixels in each of the at least three planes using a tomographic algorithm and signal processing technique, based at least partly on the signaling received. By way of example, the same subset of pixels may be along an axis parallel to the pipe in each of the at least three planes. In other embodiment based on multiple subsets of pixels, one same subset of pixels may be along one axis parallel to the pipe in each of the at least three planes, and another same subset of pixels may be along another axis also parallel to the pipe in each of the at least three planes.

The signal processor module may include a SONAR-based and signal processing module configured to receive the tomographic signaling and determine the flow rate using a SONAR-based algorithm and signal processing technique, based at least partly on the tomographic signaling received.

The signaling may be electrical signaling sensed and received from the same limited subset of multiple electrodes spaced at predetermined intervals and configured in each of the at least three planes around the circumference of the pipe, tank, cell or vessel.

The multiple electrodes may be equally spaced at the predetermined intervals.

The multiple electrodes may be conductivity-based or permittivity-based electrical sensors or electrodes, e.g., including being configured in an array.

The apparatus may include the multiple electrodes.

The tomographic processing technique may include using Electrical Resistance Tomography (ERT), including using Electrical Impedance Tomography (EIT) for conducting fluids based on conductivity, using Electrical Capacitive Tomography (ECT) for non-conducting fluids based on permittivity, or using a combination of said technologies.

The signal processor module may include, or form part of, a SONAR-based signal processing unit or module configured to determine the flow rate using the combined tomographic and SONAR-based algorithm and signal processing technique.

The apparatus may be configured as a hybrid electrical tomography system with SONAR processing on an array of electrodes, e.g., including conductivity-based or permittivity-based electrical sensors or electrodes.

The at least three planes may be substantially perpendicular to a longitudinal axis on the pipe, tank, cell or vessel and spaced at a predetermined distance along the longitudinal axis, although embodiments using non-perpendicular planes are also envisioned.

The signal processor or processing module may be configured with at least one processor and at least one memory including computer program code, the at least one memory and computer program code configured, with the at least one processor, to cause the apparatus at least to receive the signaling and determine the flow rate, based at least partly on the signaling received.

The Method

According to some embodiments, the present invention may include, or take the form of, a method or process that includes steps for receiving in a signal processor module signaling containing information about electrical responses to a transiting flow perturbation in at least three planes of a fluid flowing in a pipe, tank, cell or vessel; and determining in the signal processor module a flow rate of the fluid flowing in the pipe, tank, cell or vessel using a combined tomographic and SONAR-based algorithm and signal processing technique, based at least partly on the signaling received.

The method may also include one or more of the features set forth herein, according to some embodiments of the present invention.

BRIEF DESCRIPTION OF THE DRAWING

The drawing includes FIGS. 1-7, which are not necessarily drawn to scale, as follows:

FIG. 1a shows a generic configuration for 'in-pipe' tomographic imaging using multiple electrodes around the pipe wall.

FIG. 1b shows a type of image created using tomographic analysis of flows.

FIG. 2 shows the apparatus in the form of a hybrid electrical tomography system configured with tomographic electrodes and a SONAR-based processing unit.

FIG. 3a shows a block diagram of apparatus according to some embodiments of the present invention.

FIG. 3b shows a block diagram of the signal processor or processing module shown in FIG. 3a, according to some embodiments of the present invention.

FIG. 4 is schematic diagram of an apparatus known in the art for determining at least one parameter associated with a fluid flowing in a pipe using a known spatial sensor array.

FIG. 5 is a cross-sectional view of a pipe having a spatial sensor array arranged thereon.

DETAILED DESCRIPTION OF BEST MODE OF THE INVENTION

FIG. 2

Figure 6:
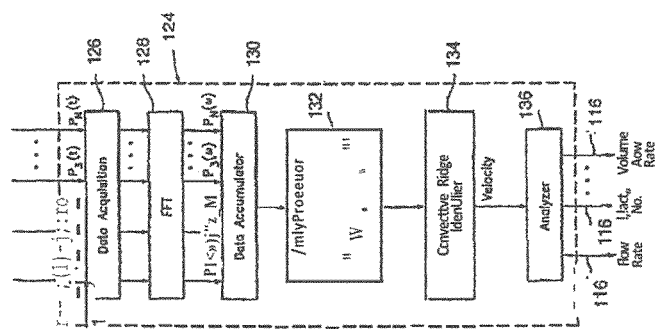
FIG. 6 is a block diagram of a flow logic known in the art.

FIG. 2 shows the basic concept of the present invention in the form of a hybrid electrical tomography system generally indicated 2 with a SONAR-based signal processing type unit 4 on an array of electrodes 6. The basic concept includes using tomography for electrical sensing in combination with a signal processing technique modeled after known SONAR-based signal processing techniques, e.g., including those developed by the assignee of the present application. In FIG. 2, the array of electrodes 6 is conceptually shown to be configured as a tomographic array of electrodes, and the SONAR-based signal processing type unit 4 is conceptually shown to be configured to receive signaling generally indicated as $S_1$ from the tomographic array of electrodes 6 and process the signaling received using the signal processing technique modeled after, and consistent with, the known SONAR-based signal processing techniques.

By way of example, according to some embodiments of the present invention, tomographic techniques may be used to sense and process signaling containing information about electrical responses to a transiting flow perturbation in at least three planes of a fluid flowing in a pipe 8 at at least three axial locations along the pipe, consistent with that shown in FIG. 2. Then, sensed and processed tomographic signaling may be further processed to determine a flow rate of the fluid flowing in the pipe using a SONAR-based algorithm and signal processing technique, according to some embodiments of the present invention.

By way of further example, in the known SONAR-based signal processing technique unsteady pressures-based electrical responses to an associated transiting flow perturbation of an associated fluid flowing in an associated pipe may be sensed using pressure sensor at different axial locations as the fluid flows along the pipe, and correlated and further processed to determine the flow rate of the fluid flowing in the pipe, consistent with that shown and described below in relation to FIGS. 4-7. According to some embodiments of the present invention, the known SONAR-based processing techniques may be extended and used for a flow rate determination to operate via a series of electrodes used to probe the conductivity or permittivity fluctuations of a fluid flowing in a pipe. In particular, a limited set of conductivity-based or permittivity-based electrical responses to the transiting flow perturbation of the fluid flowing in the pipe may be sensed using conductivity-based or permittivity-based electrical sensors at at least three different axial locations as the fluid flows along the pipe, and tomographic signaling further processed to determine the flow rate of the fluid flowing in the pipe using the SONAR-based algorithm and signal processing technique, according to some embodiments of the present invention, which is modeled after, and consistent with, the known SONAR-based signal processing techniques set forth below.

Consistent with that shown in FIG. 2, the tomographic array of electrodes 6 may be configured or placed along the pipe spaced at predetermined intervals (e.g. nominally equally spaced) to provide probing of the fluid flow, according to some embodiments of the present invention. Consistent with that shown in FIG. 2, a subset of the electrodes in the tomographic array of electrodes 6 may be used to provide limited probing of the fluid flow, according to some embodiments of the present invention. Alternatively, a subset of electrodes in the tomographic array of electrodes 6 may be configured or placed along the pipe spaced at predetermined intervals (nominally equally spaced) to provide limited probing of the fluid flow, according to some embodiments of the present invention. In other words, the scope of the invention is not intended to be limited to the number of electrodes in the tomographic array of electrodes 6 configured or placed along the pipe, or the number of electrodes in the tomographic array of electrodes 6 used to probe of the fluid flow. Consistent with that also shown in FIG. 2, the sensed signals or electrical signaling generated by the transiting flow perturbation may be coupled to the SONAR-based signal processing type unit 4 in order to perform the SONAR-based algorithm and signal processing technique, according to the present invention, modeled after the known SONAR-based signal processing techniques, e.g., consistent with that disclosed below.

FIGS. 3a: The Basic Apparatus 10

FIG. 3a shows apparatus 10 having a signal processor or processing module 10a for implementing the combined tomographic and SONAR-based and modeled signal processing functionality according to some embodiments of the present invention. The signal processor or processing module 10a may be configured as, or form part of, the SONAR-based signal processing type unit 4.

In operation, the signal processor or processing module 10a may be configured at least to
receive signaling, e.g., $S_1$ (FIG. 2), containing information about electrical responses to a transiting flow perturbation in at least three planes of a fluid flowing in a pipe, tank, cell or vessel sensed; and
determine a flow rate of the fluid flowing in the pipe, tank, cell or vessel using a combined tomographic and SONAR-based algorithm and signal processing technique, based at least partly on the signaling received.

By way of example, the signal processor module 10a may be configured to provide corresponding signaling containing information about the flow rate determined, according to some embodiment of the present invention. The scope of the invention is not intended to be limited to the type or kind of use of the corresponding signaling containing information about the flow rate up in the pipe, tank, cell or vessel, including for further processing, printing, displaying, or flow or process control, as well as for other types or kinds of uses either now known or later developed in the future.

By way of example, and consistent with that shown in FIG. 3b, the signal processing module 10a may include a tomographic signal processing module 10a' configured to receive the signaling, e.g., $S_1$ (FIG. 2), and provide tomographic signaling containing information about the same subset of pixels in each of the at least three planes using a tomographic algorithm and signal processing technique, based at least partly on the signaling $S_1$ received, according to some embodiment of the present invention. By way of example, the same subset of pixels may be along an axis parallel to the pipe in each of the at least three planes. Moreover, the scope of the invention is intended to include, and embodiments are envisioned to take the form of, the tomographic signal processing module 10a' receiving the signaling $S_1$, and providing other tomographic signaling containing other types or kinds of tomographic information that can by further processed in order to determine the flow rate, within the spirit of the present invention. Moreover still, the scope of the invention is intended to include, and embodiments are envisioned to take the form of, the tomographic signaling containing information about the same subset of pixels along multiple axes (parallel to the pipe) in each of the at least three planes, e.g., at the top, the middle and the bottom of the pipe. Moreover still, the scope of the invention is intended to include, and embodiments are envisioned to take the form of, the tomographic signaling containing information about a respective full tomographic image in each of the at least three planes for further processing according to the present invention using the SONAR-based algorithm.

By way of example, the signaling $S_1$ may be electrical signaling sensed and received from the same limited subset of multiple electrodes 6 spaced at predetermined intervals and configured in the at least three planes around the circumference of the pipe, tank, cell or vessel, consistent with that shown in FIG. 2. The multiple electrodes 6 may be equally spaced at the predetermined intervals. The multiple electrodes 6 may be conductivity-based or permittivity-based electrical sensors or electrodes, e.g., including being configured in an array. The apparatus 10 may include, or form part of, the multiple electrodes 6, according to some embodiments of the present invention. Electrodes like element 6, e.g., including conductivity-based or permittivity-based electrical sensors or electrodes, are known in the art, and the scope of the invention is not intended to be limited to any particular type or kind thereof, either now known or later developed in the future.

The tomographic processing technique may include using Electrical Resistance Tomography (ERT), including using Electrical Impedance Tomography (EIT) for conducting fluids based on conductivity, using Electrical Capacitive Tomography (ECT) for non-conducting fluids based on permittivity, or using a combination thereof.

By way of example, and consistent with that shown in FIG. 3b, the signal processor module 10a may also include a SONAR-based signal processing module 10a" configured to receive the tomographic signaling, e.g., from the tomographic signal processing module 10a', and determine the flow rate using a SONAR-based algorithm and signal processing technique, based at least partly on the tomographic signaling received. Moreover, the scope of the invention is intended to include, and embodiments are envisioned to take the form of, the SONAR-based and modeled signal processing module 10a" receiving other tomographic signaling containing other types or kinds of tomographic information, and determining the flow rate, within the spirit of the present invention.

Further, the scope of the invention is not intended to be limited to the type or kind of fluid contained, processed or flowing in the pipe, tank, cell or vessel. For example, the scope of the invention is intended to include processing fluids that are either now known or later developed in the future. Moreover, the scope of the invention is intended to include sensing and determining the flow rate in pipes, tanks, cells, vessels, etc., that are either now known or later developed in the future. Moreover still, the scope of the invention is not intended to be limited to the type or kind of industrial process of which the fluid is being processed, including a process or processes that is or are either now known or later developed in the future.

The apparatus 10 may also include other circuits, components or modules 10b to implement the functionality of the signal processor or processing module 10a either now known or later developed in the future, e.g., including memory modules, input/output modules, data and busing architecture and other signal processing circuits, wiring or components, consistent with that known by a person skilled in the art, and/or consistent with that set forth herein. By way of example, other circuits, components or modules 10b may include an input module configured to receive the signal from the electrodes 6 and provide the same to the signal processing module 10a, and may also be configured with an output module configured to provide the corresponding signaling containing information about the flow rate. By way of further example, and according to some embodiments of the present invention, the signal processor or processing module 10a may be configured with at least one processor and at least one memory including computer program code, the at least one memory and computer program code configured, with the at least one processor, to cause the apparatus at least to receive the signaling and determine the flow rate, based at least partly on the signaling received.

Signal Processor or Signal Processing Module 10a, 10a', 10a"

By way of example, and consistent with that described herein, the functionality of the signal processor or processing module 10a, as well as the tomographic signal processing module 10a' or the SONAR-based signal processing module 10a", may be implemented to receive the signaling, process the signaling, and/or provide the corresponding signaling, using hardware, software, firmware, or a combination thereof, although the scope of the invention is not intended to be limited to any particular embodiment thereof. In a typical software implementation, the signal processor or processing module 10a, 10a' or 10" may include, or take the form of, one or more microprocessor-based architectures having a microprocessor, a random access memory (RAM), a read only memory (ROM), input/output devices and control, data and address busing architecture connecting the same. A person skilled in the art would be able to program such a microprocessor-based implementation to perform the functionality set forth herein, as well as other functionality described herein without undue experimentation. The scope of the invention is not intended to be limited to any particular implementation using technology either now known or later developed in the future. Moreover, the scope of the invention is intended to include a signal processor, device or module 10a, 10a' or 10a" as either part of the aforementioned apparatus, as a stand alone module, or in the combination with other circuitry for implementing another module.

Techniques for receiving signaling in such a signal processor or processing module 10a, 10a' or 10a" are known in the art, and the scope of the invention is not intended to be limited to any particular type or kind thereof either now known or later developed in the future. Based on this understanding, a person skilled in the art would appreciate, understand and be able to implement and/or adapt the signal processor or processing module 10a, 10a' or 10a" without undue experimentation so as to receive signaling containing information about electrical responses to a transiting flow perturbation in at least three planes of a fluid flowing in a pipe, tank, cell or vessel, consistent with that set forth herein. Based on this understanding, a person skilled in the art would appreciate, understand and be able to implement and/or adapt the signal processor or processing module 10a, 10a' or 10a" without undue experimentation so as to determine a flow rate of the fluid flowing in the pipe, tank, cell or vessel using a combined tomographic and SONAR-based algorithm and signal processing technique, based at least partly on the signaling received.

Tomographic Techniques

Techniques, including techniques based on tomography or tomographic processing techniques, for determining information based on analyzing or processing signaling received in such a signal processor or processing module 10a, 10a' are also known in the art, and the scope of the invention is not intended to be limited to any particular type or kind thereof either now known or later developed in the future. Based on this understanding, a person skilled in the art would appreciate, understand and be able to implement and/or adapt the signal processor or processing module 10a, 10a' without undue experimentation so as to receive and process the signaling, and determine and provide tomographic signaling, e.g., containing information about the same subset of pixels in each of the three planes using a tomographic signal processing technique, based at least partly on the signaling received, consistent with that set forth herein.

Techniques, including techniques based on SONAR-based signal processing techniques, for determining information based on analyzing or processing tomographic signaling received in such a signal processor or processing module 10a, 10a" are also known in the art, and the scope of the invention is not intended to be limited to any particular type or kind thereof either now known or later developed in the future. Based on this understanding, a person skilled in the art would appreciate, understand and be able to implement and/or adapt the signal processor or processing module 10a, 10" without undue experimentation so as to receive and process the tomographic signaling, and to determine the flow rate, e.g., using a SONAR-based algorithm and signal processing technique, based at least partly on the tomographic signaling received, e.g., consistent with that set forth herein.

It is also understood that the apparatus 10 may include one or more other modules, components, processing circuits, or circuitry 10b for implementing other functionality associated with the underlying apparatus that does not form part of the underlying invention, and thus is not described in detail herein. By way of example, the one or more other modules, components, processing circuits, or circuitry may include random access memory, read only memory, input/output circuitry and data and address buses for use in relation to implementing the signal processing functionality of the signal processor, or devices or components, etc.

Tomography or Tomographic Processing Techniques in General

Tomography or tomographic processing techniques are known in the art, and generally understood to refer to imaging by sections or sectioning, through the use of any kind of penetrating wave. A device used in tomography is called a tomograph, while the image produced is a tomogram. Such methods or techniques may be used, e.g., in radiology, archaeology, biology, geophysics, oceanography, materials science, astrophysics, quantum information and other sciences. In most cases, such methods or techniques may be based on the mathematical procedure called tomographic reconstruction. Tomographic reconstruction algorithms are known in the art for determining the imaging by sections or sectioning, through the use of any kind of penetrating wave. By way of example, the reader is referred to U.S. Pat. Nos. 6,078,397; 5,181,778; 4,386,854; and 4,328,707, which all relate to tomographic techniques and are all incorporated by reference in their entirety. The scope of the invention is not intended to be limited to the type or kind of tomographic reconstruction algorithms, including those based at least partly on using ultrasonic waves, either now known or later developed in the future.

See also the following patent applications disclosing other tomographic technology developed by, and assigned to, the assignee of the present invention, as follows:

PCT/US13/46738, filed 20 Jun. 2013 (WFVA/CiDRA file nos. 712-2.392-1/CCS-0098), which claims benefit to provisional patent application Ser. No. 61/662,094, filed 20 Jun. 2012 (WFVA/CiDRA file nos. 712-2.392/CCS-0098);

PCT/US12/28285, filed 28 Feb. 2013 (WFVA/CiDRA file nos. 712-2.376-1/CCS-0080), which claims benefit to provisional patent application Ser. No. 61/604,080, filed 28 Feb. 2012 (WFVA/CiDRA file nos. 712-2.376/CCS-0080);

PCT application no. PCT/US12/60811 (712-2.363-1 (CCS-0068/70/62WO), filed 18 Oct. 2012, which claims benefit to provisional patent application Ser. No. 61/548, 513, filed 18 Oct. 2011 (WFVA/CiDRA file nos. 712-2.363 (CCS-0068/70/62);

PCT application no. PCT/US12/52074 (WFVA/CiDRA file nos. 712-2.358-1/CCS-0069WO), filed 23 Aug. 2012, which claims benefit to provisional patent application Ser. No. 61/526,336, filed 23 Aug. 2011 (WFVA/CiDRA file nos. 712-2.358/CCS-0069), which are all incorporated by reference in their entirety, and all disclose applications based at least partly on using a tomography or tomographic processing technique, which was developed and is owned by the assignee of the instant patent application, and which is hereby incorporated by reference in its entirety.

Moreover, embodiments are envisioned, and the scope of the invention is intended to include, using other types or kinds of tomography or tomographic processing technique either now known or later developed in the future.

Finally, the scope of the invention is not intended to be limited to any particular type or kind of tomography or tomographic processing technique either now known or later developed in the future.

FIGS. 4-7: Known SONAR-Based Signal Processing Techniques

By way of example, known SONAR-based signal processing techniques that may be adapted and utilized by a person skilled in the art without undue experimentation to implement the present invention may include, or take the form of that disclosed below in relation to that shown in FIGS. 4-7, as follows:

Example of Known Signal Processing Technology

By way of example, FIGS. 4-7 disclose known signal processing technology disclosed in U.S. Pat. No. 6,609,069 and U.S. Pat. No. 6,889,562, each of which are incorporated herein by reference in their entireties, related to unsteady pressures along a pipe caused by coherent structures (e.g., turbulent eddies and vortical disturbances) that convect with a fluid flowing in the pipe contain useful information regarding parameters of the fluid, where the unsteady pressures along the pipe are sensed using a spatial array 110 of at least two sensors 112 shown in FIG. 4. FIG. 4 shows apparatus for measuring the velocity and/or volumetric flow of a fluid flowing within a pipe that is also similar to that described, by way of example, in U.S. Pat. No. 7,400,985; U.S. Pat. No. 7,673,524; U.S. Pat. No. 7,895,903, as well as U.S. patent application Ser. No. 10/712,833, filed on Nov. 12, 2003, now abandoned, which are all hereby incorporated herein by reference. The present invention described in relation to FIGS. 2 and 3 above provides various new means for using this underlying signal processing technology to determine parameters of a fluid flow, such as, for example, flow rate as shown and described in relation to FIGS. 4-7, based at least partly on the use of a tomographic imaging technique consistent with that as described in relation to FIGS. 2-3 that may be used as a part of the signal processing technique modeled and based, e.g., on that described in relation to the spatial array 110 of the at least two sensors 112 shown in FIG. 4.

In FIG. 4, the known apparatus 100 measures at least one parameter associated with a flow 102 flowing within a duct, conduit or other form of pipe 104, wherein the parameter of the flow 102 may include, for example, at least one of the velocity of the flow 102 and the volumetric flow rate of the flow 102. The flow 102 is shown passing through the pipe 104, wherein the flow 102 is depicted as a non-stratified, Newtonian flow operating in the turbulent regime at Reynolds numbers above about 100,000. The flow 102 has a velocity profile 106 that is uniformly developed from the top of the pipe 104 to the bottom of the pipe 104. Furthermore, the coherent structures 108 in the non-stratified, turbulent, Newtonian flow 102 exhibit very little dispersion. In other words, the speed of convection of the coherent structures 108 is not strongly dependent on the physical size of the structures 108. It should be appreciated that, as used herein, dispersion describes the dependence of convection velocity with wavelength, or equivalently, with temporal frequency. It should also be appreciated that flows for which all wavelengths convect at a constant velocity are termed "non-dispersive" and for turbulent, Newtonian flow, there is typically not a significant amount of dispersion over a wide range of wavelength to diameter ratios.

While the flow 102 is depicted as having a uniform velocity profile, it should be appreciated that the present invention may be used to measure stratified flows 102. Stratified flow 102 has a velocity profile 106 that is skewed from the top of the pipe 104 to the bottom of the pipe 104, as may be found in industrial fluid flow processes involving the transportation of a high mass fraction of high density, solid materials through a pipe 104 where the larger particles travel more slowly at the bottom of the pipe 104. For example, the flow 102 may be part of a hydrotransport process.

The apparatus 100 of FIG. 4 measures parameters such as velocity and volumetric flow rate of a stratified flow and/or non-stratified flow 102, wherein the apparatus 100 may include a spatial array 110 of at least two sensors 112 disposed at different axial locations $x_1 \ldots x_N$ along the pipe 104. Each of the sensors 112 provides a pressure signal P(t) indicative of unsteady pressure created by coherent structures convecting with the flow 102 within the pipe 104 at a corresponding axial location $x_1 \ldots x_N$ of the pipe 104. The pressure generated by the convective pressure disturbances (e.g., eddies 108) may be measured through strained-based sensors 112 and/or pressure sensors 112. The sensors 112 provide analog pressure time-varying signals $P_1(t)$, $P_2(t)$, $P_3(t) \ldots P_N(t)$ to a signal processor 114, which determines the parameter of the flow 102 using pressure signals from the sensors 112, and outputs the parameter as a signal 116.

While the apparatus 100 is shown as including four sensors 112, it is understood that the array 110 of sensors 112 may include two or more sensors 112, each providing a pressure signal P(t) indicative of unsteady pressure within the pipe 104 at a corresponding axial location X of the pipe 104. Generally, the accuracy of the measurement improves as the number of sensors 112 in the array 110 increases. Thus, the degree of accuracy provided by the greater number of sensors 112 is offset by the increase in complexity and time for computing the desired output parameter of the flow 102 and the number of sensors 112 used is dependent at least in part on the degree of accuracy desired and the desire update rate of the output parameter provided by the apparatus 100.

The signals $P_1(t) \ldots P_N(t)$ provided by the sensors 112 in the array 110 are processed by the signal processor 114, which may be part of a larger processing unit 118. For example, the signal processor 114 may be a microprocessor and the processing unit 118 may be a personal computer or other general purpose computer. It is contemplated that the signal processor 114 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

The signal processor 114 may output the one or more parameters 116 to a display 120 or another input/output (I/O) device 122. The I/O device 122 may also accept user input parameters. The I/O device 122, display 120, and signal processor 114 unit may be mounted in a common housing, which may be attached to the array 110 by a flexible cable, wireless connection, or the like. The flexible cable may also be used to provide operating power from the processing unit 118 to the array 110 if necessary.

To determine the one or more parameters 116 of the flow 102, the signal processor 114 applies the data from the sensors 112 to flow logic 124 executed by the signal processor 114. Referring to FIG. 6, an example of flow logic 124 is shown. Some or all of the functions within the flow logic 124 may be implemented in software (using a microprocessor or computer) and/or firmware, or may be implemented using analog and/or digital hardware, having sufficient memory, interfaces, and capacity to perform the functions described herein.

The flow logic 124 may include a data acquisition unit 126 (e.g., A/D converter) that converts the analog signals $P_1(t) \ldots P_N(t)$ to respective digital signals and provides the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. Instead of FFT's, any other technique for obtaining the frequency domain characteristics of the signals $P_1(t)-P_N(t)$, may be used. For example, the cross-spectral density and the power spectral density may be used to form a frequency domain transfer functions (or frequency response or ratios) discussed hereinafter.

Figure 7:
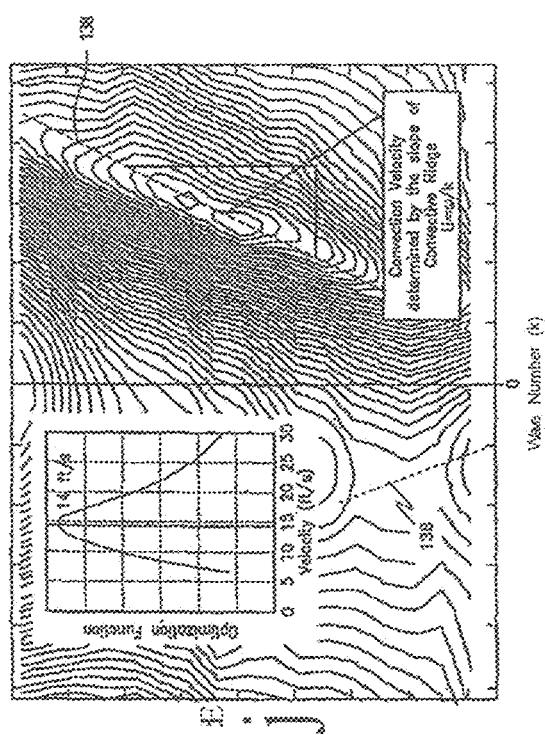
FIG. 7 is a k-ω plot of data processed from an apparatus known in the art that illustrates the slope of the convective ridge, and a plot of the optimization function of the convective ridge.

One technique of determining the convection velocity of the coherent structures (e.g., turbulent eddies) 108 within the flow 102 is by characterizing a convective ridge of the resulting unsteady pressures using an array of sensors or other beam forming techniques, similar to that disclosed U.S. Pat. No. 6,609,069, which is incorporated herein by reference in its entirety. A data accumulator 130 accumulates the frequency signals $P_1(\omega)-P_N(\omega)$ over a sampling interval, and provides the data to an array processor 132, which performs a spatial-temporal (two-dimensional) transform of the sensor data, from the x-t domain to the k-ω domain, and then calculates the power in the k-ω plane, as represented by a k-ω plot (FIG. 7).

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$, where λ is the wavelength of a spectral component, and corresponding angular frequencies given by $\omega=2\pi v$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as MUSIC algorithm. The present invention recognizes that such techniques can be used to determine flow rate, i.e. that the signals caused by a stochastic parameter convecting with a flow are time stationary and have a coherence length long enough that it is practical to locate sensors 112 apart from each other and yet still be within the coherence length.

Convective characteristics or parameters have a dispersion relationship that can be approximated by the straight-line equation, $$k = \omega/u, \quad \text{(Eqn. 1)}$$

where u is the convection velocity (flow velocity). A plot of k-ω pairs obtained from a spectral analysis of sensor samples associated with convective parameters portrayed so that the energy of the disturbance spectrally corresponding to pairings that might be described as a substantially straight ridge, a ridge that in turbulent boundary layer theory is called a convective ridge. As will be described hereinafter, as the flow becomes increasingly dispersive, the convective ridge becomes increasingly non-linear. What is being sensed are not discrete events of coherent structures 108, but rather a continuum of possibly overlapping events forming a temporally stationary, essentially white process over the frequency range of interest. In other words, the convective coherent structures 108 are distributed over a range of length scales and hence temporal frequencies.

To calculate the power in the k-ω plane, as represented by a k-ω plot (see FIG. 7) of either the signals, the array processor 132 determines the wavelength and so the (spatial) wavenumber k, and also the (temporal) frequency and so the angular frequency w, of various of the spectral components of the stochastic parameter. There are numerous algorithms available in the public domain to perform the spatial/temporal decomposition of arrays of sensors 112. It should be appreciated that the present embodiment may use temporal and spatial filtering to precondition the signals to effectively filter out the common mode characteristics Pcommon mode and other long wavelength (compared to the sensor spacing) characteristics in the pipe 104 by differencing adjacent sensors 112 and retain a substantial portion of the stochastic parameter associated with the flow field and any other short wavelength (compared to the sensor spacing) low frequency stochastic parameters.

In the case of suitable coherent structures 108 being present, the power in the k-ω plane shown in a k-ω plot of FIG. 7 shows a convective ridge 138. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 138 with some slope, the slope indicating the flow velocity.

Once the power in the k-ω plane is determined, a convective ridge identifier 134 uses one or another feature extraction method to determine the location and orientation (slope) of any convective ridge 138 present in the k-ω plane. For example, in one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information. An analyzer 136 examines the convective ridge information including the convective ridge orientation (slope) and assuming the straight-line dispersion relation given by k=ω/u, the analyzer 136 determines the flow velocity and/or volumetric flow, which are output as parameters 116. The volumetric flow may be determined by multiplying the cross-sectional area of the inside of the pipe 104 with the velocity of the process flow 102.

As previously noted, for turbulent, Newtonian fluids, there is typically not a significant amount of dispersion over a wide range of wavelength to diameter ratios. As a result, the convective ridge 138 in the k-ω plot is substantially straight over a wide frequency range and, accordingly, there is a wide frequency range for which the straight-line dispersion relation given by k=ω/u provides accurate flow velocity measurements. For stratified flows, however, some degree of dispersion exists such that coherent structures 108 convect at velocities which depend on their size. As a result of increasing levels of dispersion, the convective ridge 138 in the k-ω plot becomes increasingly non-linear. Thus, unlike the non-dispersive flows, determining the flow rate of a dispersive mixture by tracking the speed at which coherent structures 108 convect requires a methodology that accounts for the presence of significant dispersion, as described in greater detail in U.S. patent application Ser. No. 11/077,709, filed on Mar. 10, 2005, which is incorporated herein by reference.

In the embodiment shown in FIG. 4 and FIG. 5, each of the sensors 112 is formed by a strip of piezoelectric material 140 such as, for example, the polymer, polarized fluoropolymer, PVDF, which measures the strain induced within the pipe 104 due to the coherent structures convecting with the flow 102, similar to that described in U.S. patent application Ser. No. 10/712,818 and U.S. Provisional patent application Ser. No. 10/712,833, which are incorporated herein by reference. The sensors 112 can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The PVDF sensors include PVDF material disposed between a pair of conductive layers. The conductive layers are electrically connected to a processor by a pair of twisted wires, wherein the conductive layer may be formed of silver ink. The strips of piezoelectric film material forming the sensors 112 along each axial location $x_1 \ldots x_N$ of the pipe 104 may be adhered to the surface of a steel strap 142 (e.g., a hose clamp) that extends around and clamps onto the outer surface of the pipe 104. As discussed hereinafter, other types of sensors 112 and other methods of attaching the sensors 112 to the pipe 104 may be used.

As shown in FIG. 5, the PVDF material 140 of each sensor 112 is disposed substantially around the circumference of the pipe 104, which enables the sensing material 140 to measure pressure disturbances attributed to the convective vortices 106 propagating with the fluid flow 102. The configuration of the sensing material being disposed substantially around the circumference of the pipe 104 filters out pressure disturbances associated with vibration and other bending modes of the pipe 104. Unfortunately, the sensors 112 also sense unsteady pressure attributed to acoustic pressures or noise within the pipe 104, wherein the measurement of these acoustic pressures decreases the signal to noise ratio when measuring the convective turbulence 106.

In the geometry of the sensors 112 (in FIG. 5), asymmetric bending modes create equal and opposite deformation of the sensor 112 and therefore create no signal. Acoustic modes create a uniform distortion, and therefore create a signal along with a signal associated with vortical disturbances. (One might expect the acoustic signal to scale with the sensor length and the vortical signal to scale as the square root of the sensor length.) Additionally, pressure pulses and pipe fluids with uniform varying temperatures should also produce signals in this configuration. These signals, i.e. signals from the acoustic pressures, the pressure pulses, and the varying temperature fluids may degrade the measurement of the vortical pressure disturbance (vortical signals).

One method of filtering the acoustic noise is to difference the signals of adjacent sensors 112. While this increases the signal to noise ratio, it would be advantageous if each sensor 112 had the ability to filter both the unsteady pressures associated with the bending modes of the pipe 104 and the acoustic noise (or pressure field).

It should be appreciated that in any of the embodiments described herein, the sensors 112 may include electrical strain gages, optical fibers and/or gratings, ported sensors, ultrasonic sensors, among others as described herein, and may be attached to the pipe by adhesive, glue, epoxy, tape or other suitable attachment means to ensure suitable contact between the sensor 112 and the pipe 104. The sensors 112 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 104.

If desired, for certain applications, gratings may be detached from (or strain or acoustically isolated from) the pipe 104 if desired. It is also contemplated that any other strain sensing technique may be used to measure the variations in strain in the pipe 104, such as highly sensitive piezoelectric, electronic or electric, strain gages attached to or embedded in the pipe 104.

It should be further appreciated that in various embodiments of the present invention, a piezo-electronic pressure transducer may be used as one or more of the pressure sensors and it may measure the unsteady (or dynamic or ac) pressure variations inside the pipe 104 by measuring the pressure levels inside the pipe 104. For example, in one embodiment of the present invention, the sensors 112 may comprise pressure sensors manufactured by PCB Piezotronics of Depew, N.Y. and/or may include integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The sensors 112 may incorporate a built-in MOSFET microelectronic amplifier to convert the high-impedance charge output into a low-impedance voltage signal. The sensors 112 may be powered from a constant-current source and can operate over long coaxial or ribbon cable without signal degradation. It should be appreciated that the low-impedance voltage signal is not affected by triboelectric cable noise or insulation resistance-degrading contaminants and power to operate integrated circuit piezoelectric sensors generally takes the form of a low-cost, 24 to 27 VDC, 2 to 20 mA constant-current supply. Most piezoelectric pressure sensors are constructed with either compression mode quartz crystals preloaded in a rigid housing, or unconstrained tourmaline crystals. These designs advantageously give the sensors microsecond response times and resonant frequencies in the hundreds of kHz, with minimal overshoot or ringing, wherein small diaphragm diameters ensure spatial resolution of narrow shock waves.

Additionally, the output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore it is contemplated that each of the sensors 112 may include a piezoelectric sensor that provides a piezoelectric material to measure the unsteady pressures of the flow 102. The piezoelectric material, such as the polymer, polarized fluoropolymer, PVDF, measures the strain induced within the process pipe 104 due to unsteady pressure variations within the flow 102. Strain within the pipe 104 is transduced to an output voltage or current by the attached piezoelectric sensors 112. The PVDF material forming each piezoelectric sensor 112 may be adhered to the outer surface of a steel strap that extends around and clamps onto the outer surface of the pipe 112. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique include non-intrusive flow rate measurements, low cost, a measurement technique requires no excitation source (i.e. ambient flow noise is used as a source), flexible piezoelectric sensors can be mounted in a variety of configurations to enhance signal detection schemes (these configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals) and higher temperatures (140 C) (co-polymers).

It should be appreciated that the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Applications

By way of example, the present invention may be used in, or form part of, or used in conjunction with, industrial processes like a mineral extraction processing system for extracting or separating minerals in a fluidic medium that are either now known or later developed in the future, including any mineral process, such as those related to processing substances or compounds that result from inorganic processes of nature and/or that are mined from the ground, as well as including either other extraction processing systems or other industrial processes, where the extraction, or separating, or sorting, or classification, of product by size, or density, or some electrical characteristic, is critical to overall industrial process performance.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. An apparatus comprising:
a SONAR processing unit having a signal processor configured to:
receive signaling sensed by a tomographic array of electrodes placed along a pipe, tank, cell or vessel using a tomographic processing technique, and containing information about electrical responses to a transiting flow perturbation in at least three planes of a fluid flowing in the pipe, tank, cell or vessel; and
determine corresponding signaling containing information about a flow rate of the fluid flowing in the pipe, tank, cell or vessel using a combined tomographic and SONAR-based algorithm and signal processing technique, based at least partly on the signaling received.

2. The apparatus according to claim 1, wherein the SONAR processing unit is configured to provide the corresponding signaling containing information about the flow rate determined.

3. The apparatus according to claim 1, wherein the SONAR processing unit comprises a tomographic signal processing unit configured to receive the signaling and provide tomographic signaling containing information about the same subset of pixels in each of the at least three planes using a tomographic algorithm and signal processing technique, based at least partly on the signaling received.

4. The apparatus according to claim 3, wherein the SONAR processing unit comprises a SONAR-based signal processing unit configured to receive the tomographic signaling and determine the flow rate using a SONAR-based algorithm and signal processing technique, based at least partly on the tomographic signaling received.

5. The apparatus according to claim 1, wherein the signaling received is electrical signaling sensed from the same limited subset of multiple electrodes in the tomographic array spaced at predetermined intervals and configured in each of the at least three planes around the circumference of the pipe, tank, cell or vessel.

6. The apparatus according to claim 5, wherein the multiple electrodes are equally spaced at the predetermined intervals.

7. The apparatus according to claim 5, wherein the multiple electrodes are multiple conductivity-based or permittivity-based electrical sensors or electrodes.

8. The apparatus according to claim 7, wherein the apparatus comprises the multiple electrodes.

9. The apparatus according to claim 1, wherein the tomographic processing technique includes using Electrical Resistance Tomography (ERT), including using Electrical Impedance Tomography (EIT) for conducting fluids based on conductivity, using Electrical Capacitive Tomography (ECT) for non-conducting fluids based on permittivity, or using a combination thereof.

10. The apparatus according to claim 1, wherein the apparatus comprises, is configured as, or form part of, a SONAR-based processing unit arranged in a hybrid electrical tomography system having the tomographic array of electrodes.

11. The apparatus according to claim 1, wherein the SONAR processing unit is configured with at least one processor and at least one memory including computer program code, the at least one memory and computer program code configured, with the at least one processor, to cause the apparatus at least to receive the signaling and determine the corresponding signaling containing information about the flow rate, based at least partly on the signaling received.

12. The apparatus according to claim 1, wherein the apparatus comprises, or takes the form of, a hybrid electrical tomography system having the SONAR processing unit in combination with the tomographic array of electrodes.

13. A method comprising:
receiving in a SONAR processing unit having a signal processor signaling sensed by a tomographic array of electrodes placed along a pipe, tank, cell or vessel using a tomographic processing technique, and containing information about electrical responses to a transiting flow perturbation in at least three planes of the fluid flowing in a pipe, tank, cell or vessel; and
determining in the SONAR processing unit having the signal processor corresponding signaling containing information about a flow rate of the fluid flowing in the pipe, tank, cell or vessel using a combined tomographic and SONAR-based algorithm and signal processing technique, based at least partly on the signaling received.

14. The method according to claim 13, wherein the method comprises providing from the SONAR processing unit the corresponding signaling containing information about the flow rate determined.

15. The method according to claim 13, wherein the method comprises configuring the SONAR processing unit with a tomographic signal processing unit to receive the signaling and provide tomographic signaling containing information about the same subset of pixels in each of the at least three planes using a tomographic algorithm and signal processing technique, based at least partly on the signaling received.

16. The method according to claim 15, wherein the method comprises configuring the SONAR processing unit with a SONAR-based signal processing unit to receive the tomographic signaling and determine the flow rate using a SONAR-based algorithm and signal processing technique, based at least partly on the tomographic signaling received.

17. The method according to claim 13, wherein the signaling is electrical signaling received from the same limited subset of multiple electrodes spaced at predetermined intervals and configured in the at least three planes around the circumference of the pipe, tank, cell or vessel.

18. The method according to claim 17, wherein the method comprises receiving the signaling from the multiple electrodes that are equally spaced at the predetermined intervals.

19. The method according to claim 17, wherein the method comprises receiving the signaling from multiple conductivity-based or permittivity-based electrical sensors or electrodes.

20. The method according to claim 13, wherein the tomographic processing technique includes using Electrical Resistance Tomography (ERT), including using Electrical Impedance Tomography (EIT) for conducting fluids, using Electrical Capacitive Tomography (ECT) for non-conducting fluids, or using a combination thereof.

21. The method according to claim 13, wherein the method comprises configuring the SONAR processing unit in a hybrid electrical tomography system having the tomographic array of electrodes to determine the flow rate using the combined tomographic and SONAR-based algorithm and signal processing technique.

22. The method according to claim 13, wherein the method comprises configuring a hybrid electrical tomography system with a SONAR-based signal processing unit and the tomographic array of electrodes.

23. The method according to claim 13, wherein the at least three planes are substantially perpendicular to a longitudinal axis on the pipe, tank, cell or vessel and spaced at a predetermined distance along the longitudinal axis.

* * * * *